(12) United States Patent
Talaie et al.

(10) Patent No.: US 6,985,716 B2
(45) Date of Patent: Jan. 10, 2006

(54) RADIO SIGNAL BROADCAST SYSTEM AND METHOD

(75) Inventors: Farzad Talaie, Redondo Beach, CA (US); John G. Himes, Placentia, CA (US); Anthony R. Noerpel, Lovettsville, VA (US); John L. Rotondo, El Segundo, CA (US); Richard H. Johnson, Redondo Beach, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 173 days.

(21) Appl. No.: 10/418,492

(22) Filed: Apr. 18, 2003

(65) Prior Publication Data

US 2004/0018834 A1    Jan. 29, 2004

Related U.S. Application Data

(62) Division of application No. 09/552,297, filed on Apr. 19, 2000, now Pat. No. 6,711,398.

(51) Int. Cl.
*H04B 7/185* (2006.01)
*H04Q 7/20* (2006.01)

(52) U.S. Cl. .................. 455/403; 455/12.1; 455/17; 455/427; 455/435.1; 455/411; 370/315; 370/316; 370/321

(58) Field of Classification Search ............... 455/403, 455/3.01, 3.02, 12.1, 11.1, 17, 427, 13.2, 455/13.3, 7; 370/321, 316
See application file for complete search history.

(56) References Cited

U.S. PATENT DOCUMENTS 5,287,541 A    2/1994    Davis et al.
5,351,240 A    9/1994    Highsmith
5,699,355 A    12/1997   Natarajan
5,721,534 A    2/1998    Olds et al.
5,736,959 A    4/1998    Patterson et al.

(Continued)

FOREIGN PATENT DOCUMENTS

GB    2 319 699 A    5/1998

(Continued)

OTHER PUBLICATIONS

Archer et al., "Military UHF and Commercial Geo-Mobile System combination For Radio Signal Relay", U.S. Appl. No. 09/565,785, filed May 5, 2000.

(Continued)

*Primary Examiner*—Joseph Feild
*Assistant Examiner*—Kamran Afshar
(74) *Attorney, Agent, or Firm*—Georgann S. Grunebach

(57) ABSTRACT

A first transmitting device is used to transmit a first signal on a first carrier frequency to a relay device. The relay device receives the signal by demodulating the first carrier frequency. Subsequently, the relay device retransmits the signal by modulating a second and/or a third carrier frequency. The signal is then recovered at one or more receiving devices by demodulating the second and/or third carrier frequencies. Further, a second transmitting device transmits a second signal on a fourth carrier frequency and the relay device retransmits the signal by modulating a fifth and/or a sixth carrier frequency. The signal is then recovered at one or more receiving devices by demodulating the fifth and/or sixth carrier frequencies. The transmitting and/or receiving devices are preferably voice terminals, such as a wireless telephones or data terminals, such as portable computers. The transmitting and/or receiving devices are optionally coupled to a communications network, such as a public switched telephone network or the Internet. The relay device is preferably a multiple beam satellite and/or a ground station covering several distinct geographical regions.

13 Claims, 5 Drawing Sheets

U.S. PATENT DOCUMENTS

| | | | |
|---|---|---|---|
| 5,812,947 A | 9/1998 | Dent | |
| 5,864,579 A | 1/1999 | Briskman | |
| 5,920,814 A * | 7/1999 | Sawyer et al. | 455/422.1 |
| 5,926,745 A | 7/1999 | Threadgill et al. | |
| 5,963,846 A * | 10/1999 | Kurby | 455/12.1 |
| 6,014,372 A | 1/2000 | Kent et al. | |
| 6,067,045 A | 5/2000 | Castelloe et al. | |
| 6,067,442 A | 5/2000 | Wiedeman et al. | |
| 6,088,571 A | 7/2000 | Kane et al. | |
| 6,125,261 A | 9/2000 | Anselmo et al. | |
| 6,128,469 A | 10/2000 | Zenick et al. | |
| 6,151,308 A | 11/2000 | Ibanez-Meier et al. | |
| 6,160,994 A | 12/2000 | Wiedeman | |
| 6,272,317 B1 | 8/2001 | Houston et al. | |
| 6,272,340 B1 * | 8/2001 | Wright et al. | 455/427 |
| 6,292,661 B1 * | 9/2001 | Patronen et al. | 455/436 |
| 6,301,476 B1 | 10/2001 | Monte et al. | |
| 6,311,128 B1 | 10/2001 | Prum et al. | |
| 6,324,381 B1 | 11/2001 | Anselmo et al. | |
| 6,336,030 B2 | 1/2002 | Houston et al. | |
| 6,396,826 B1 * | 5/2002 | Ohlson et al. | 370/342 |
| 6,400,925 B1 | 6/2002 | Tirabassi et al. | |
| 6,424,717 B1 | 7/2002 | Pinder et al. | |
| 6,493,322 B1 * | 12/2002 | Chennakeshu et al. | 370/252 |
| 6,711,398 B1 * | 3/2004 | Talaie et al. | 455/403 |

FOREIGN PATENT DOCUMENTS

| | | |
|---|---|---|
| GB | 2 320 162 A | 6/1998 |
| WO | WO 97 37442 A | 10/1997 |

OTHER PUBLICATIONS

Talaie et al., "Geo-Mobile Satellite System Configuration With High-Speed Data Capability", U.S. Appl. No. 09/552,296, filed Apr. 19, 2000.

Gang Wu et al., "A Dynamic TDMA Wireless Integrated Voice/Data System with Data Steal into Voice (DSV) Technique", IEEE, vol. 2, Nov. 1995, pp. 1473-1481.

* cited by examiner

RADIO SIGNAL BROADCAST SYSTEM AND METHOD

This Application is a division of U.S. patent application Ser. No. 09/552,297, filed Apr. 19, 2000, U.S. Pat. No. 6,711,398.

TECHNICAL FIELD OF THE INVENTION

The present invention relates in general to netted communication systems and in particular to netted radio broadcast communications.

BACKGROUND OF THE INVENTION

Radio communication systems rely on modulating carrier frequencies (i.e. a channel) in a finite portion of the electromagnetic spectrum to wirelessly transmit and receive signals. Modulation can be performed on the amplitude, frequency, and/or phase of the carrier frequency to separate the signal from unwanted noise. The signals typically convey information such as voice, video, and computer data between transmitting/receiving devices such as voice terminals (e.g., wireless phone) and data terminals (e.g., portable computer).

In order to transmit the signals over a large distance, a relay such as a satellite may be used. Passive communication satellites may be used to return transmitted signals to earth on the same carrier frequency they were transmitted on. Active communication satellites can be used to receive the transmitted signals on one carrier frequency and to retransmit the signals on another carrier frequency. Geosynchronous satellites are especially well suited for such a task due to their stationary position relative to the earth's surface.

Often it is desirable to communicate in a netted broadcast fashion. For example, a military commander may need to transmit an order to a large number of receivers which individually confirm that they received the order, or a data server may need to transmit information to multiple clients who verify reception. Currently, systems relay broadcast signals on a particular frequency and people who want to participate, tune their receiver to that channel, as in a UHF satellite system. Alternatively, conference calls may be established. Each participant in the conference call communicates with a central station such as a cell site or satellite using a pair of unique carrier frequencies. The central station combines the signals of conferencing callers and then transmits the combined signal to each receiver using its unique carrier frequency.

Prior art approaches for netted broadcast communication suffer from certain drawbacks. For instance, conference calling requires one channel per user. As the number of receivers grows the channels-are exhausted. Therefore, only a relatively small number of receivers may participate. Similarly, UHF and other broad beam systems have a relatively small number of channels and require users to tune their receiver to one particular channel. None of these techniques are well suited for use in a digital beam forming satellite communication system, wherein multiple beams distinguished by frequency band are used to cover multiple geographical regions while reusing frequencies to increase capacity in a spectrum limited system.

SUMMARY OF THE INVENTION

The present invention relates to efficient bandwidth utilization in radio communication systems broadcasting to a plurality of receivers in distinct geographical regions representing multiple nets and multiple conflict regions. This invention may support a stand-alone system, but it also may serve as an overlay on an existing system that offers point-to-point communications, retaining protocols, channels, etc. of the latter. The present invention describes a system and method for distributing the radio signals wherein transmitting devices transmit signals to relay devices which, in turn, retransmit the signals on supplementary carrier frequencies to a large number of users distributed across a large geographical region (i.e., multiple beams, multiple conflict regions, and multiple nets). The signals are then recovered by receiving devices preferably in one or more beams of a beam forming satellite. Preferably, only one frequency channel per beam is used for traffic from a particular broadcast, thereby increasing the broadcast capacity and allowing an unlimited number of receivers. Bandwidth can be dynamically allocated to broadcast service, or it can be returned to be used for baseline (existing) services, e.g., point-to-point (ptp), voice, data, fax services.

The present invention utilizes existing protocols and control channels to configure and set up voice net broadcast services with little to no modifications to control channels. The present invention will support simultaneous point-to-point features (voice, data, and fax) while supporting voice broadcast services. The capacity of the system is limited only by the amount of available power and bandwidth. Control channels are used for registration, net set-ups, authentication, and net key transmission, while traffic channels are used for the actual signal transmission. In addition, a separate control channel is associated to each net for link maintenance purposes (e.g., time, frequency, and power control).

In accordance with a first aspect of the invention, a system for broadcasting netted radio signals is provided. The system comprises a first transmitting device for transmitting a first signal on a first carrier frequency. The system also comprises a relay device for receiving the first signal on the first carrier frequency and transmitting the first signal on second and third carrier frequencies. In addition, the system is provided with a first receiving device for receiving the first signal on the second carrier frequency and a second receiving device for receiving the first signal on the third carrier frequency.

In a preferred embodiment, the relay device comprises a satellite device. In such an embodiment the relay device may be a digital beam forming geosynchronous communications satellite. In another preferred embodiment, the relay device comprises a satellite and a ground segment.

In any of the forgoing embodiments, the signals may comprise voice signals and/or digital signals. Further, any transmitting device may comprise a portable voice communicator and/or a data terminal. Still further, the transmitting devices, relay device, and/or receiving devices may comprise time division, code division, and/or frequency division multiple access devices. The transmitting devices (terminals) can support all existing voice/data/fax services while offering net broadcast features. In addition, any of the participating users may be able to transmit in the net. The control mechanism for getting access to the net is managed by push-to-talk access method. Precedence and preemption capability is also implanted to provide access and transmission privileges to users with higher authority. In some preferred embodiments, the transmitting device and/or receiving device may be coupled to a communications network. In such an embodiment, the communications network may comprise a public switched telephone network and/or the Internet. Further in any of the forgoing embodiments, the carrier frequency may be an L-band, S-band, C-band, Ku-band and/or a Ka-band frequency.

In accordance with another aspect of the invention, a method of broadcasting a netted radio signal is provided. The method comprises the steps of transmitting a first message requesting participation in a predetermined distribution of the radio signal and receiving a second control message granting permission and acknowledging participation in the predetermined distribution of the radio signal (on existing control channels) and identifying a frequency on which to transmit and/or receive the radio signal. The method further comprises the steps completing authentication, and ciphering process and granting net session key for privacy and of tuning a receiver to the identified frequency and receiving the radio signal on the identified frequency. Upon completion of this step, the users may select to tune to assigned receiver frequencies to receive broadcast satellite. In addition, users may tune to another frequency when they wish to transmit on the net.

In a preferred embodiment, the first message is transmitted by a voice terminal or a data terminal. In some preferred embodiments, the relay device comprises a satellite device. In such an embodiment, the relay device may be a digital beam forming geosynchronous communications satellite. In another preferred embodiment, the relay device comprises a ground station. In yet another preferred embodiment, the second message identifies an L-band, S-band, C-band, Ku-band and/or a Ka-band frequency. In any of the forgoing embodiments, the signals may comprise voice signals and/or a digital signals.

In accordance with yet another aspect of the invention, a method of broadcasting a radio signal is provided. The method comprises the steps of transmitting a first message, e.g., (PTT), requesting participation in a predetermined distribution of the radio signal and determining a frequency on which to transmit the radio signal based on previous assignment of frequencies for specific nets. The method further comprises the step of transmitting a second message acknowledging participation in the predetermined distribution of the radio signal and acknowledging a preselected frequency on which the radio signal is to be transmitted. In addition the method comprises the step of transmitting the radio signal on the identified frequency.

In a preferred embodiment, the first message is transmitted by a voice terminal or a data terminal. In some preferred embodiments, the relay device comprises a satellite device. In such an embodiment the relay device may be a digital beam forming geosynchronous communications satellite. In another preferred embodiment, the relay device comprises a ground station. In yet another preferred embodiment, the second message identifies an L-band, S-band, C-band, Ku-band and/or a Ka-band frequency. In any of the forgoing embodiments, the signals may comprise voice signals and/or digital signals.

The present invention significantly increases the capacity of broadcast radio communication systems by using one frequency channel per beam per broadcast. A large number of multiple broadcasts and networks, each covering distinct and (possibly) overlapping geographical regions, may be formed with virtually an unlimited number of transceivers participating. Further, the techniques of the present invention in no way preclude resource sharing with conventional (non-netted broadcast) traffic at the relay.

BRIEF DESCRIPTION OF THE DRAWINGS

These and other features and advantages of the present invention will become more apparent from a consideration of the following detailed description of certain preferred embodiments when taken in conjunction with the drawings in which.

DETAILED DESCRIPTION OF THE PREFERRED EMBODIMENTS

Although the following description focuses on systems and methods for broadcasting radio signals in a netted fashion, persons of ordinary skill in the art will readily appreciate that the techniques of the present invention are in no way limited to radio communication systems or to broadcast distribution. On the contrary, any communication system which broadcasts data in a one-to-many fashion might benefit from the techniques described and illustrated herein. Such systems might include wired systems, such as computer networks. Further, wired or wireless communication systems transmitting information from a plurality of sources could employ the techniques provided herein without departing from the scope of the invention.

Figure 1:
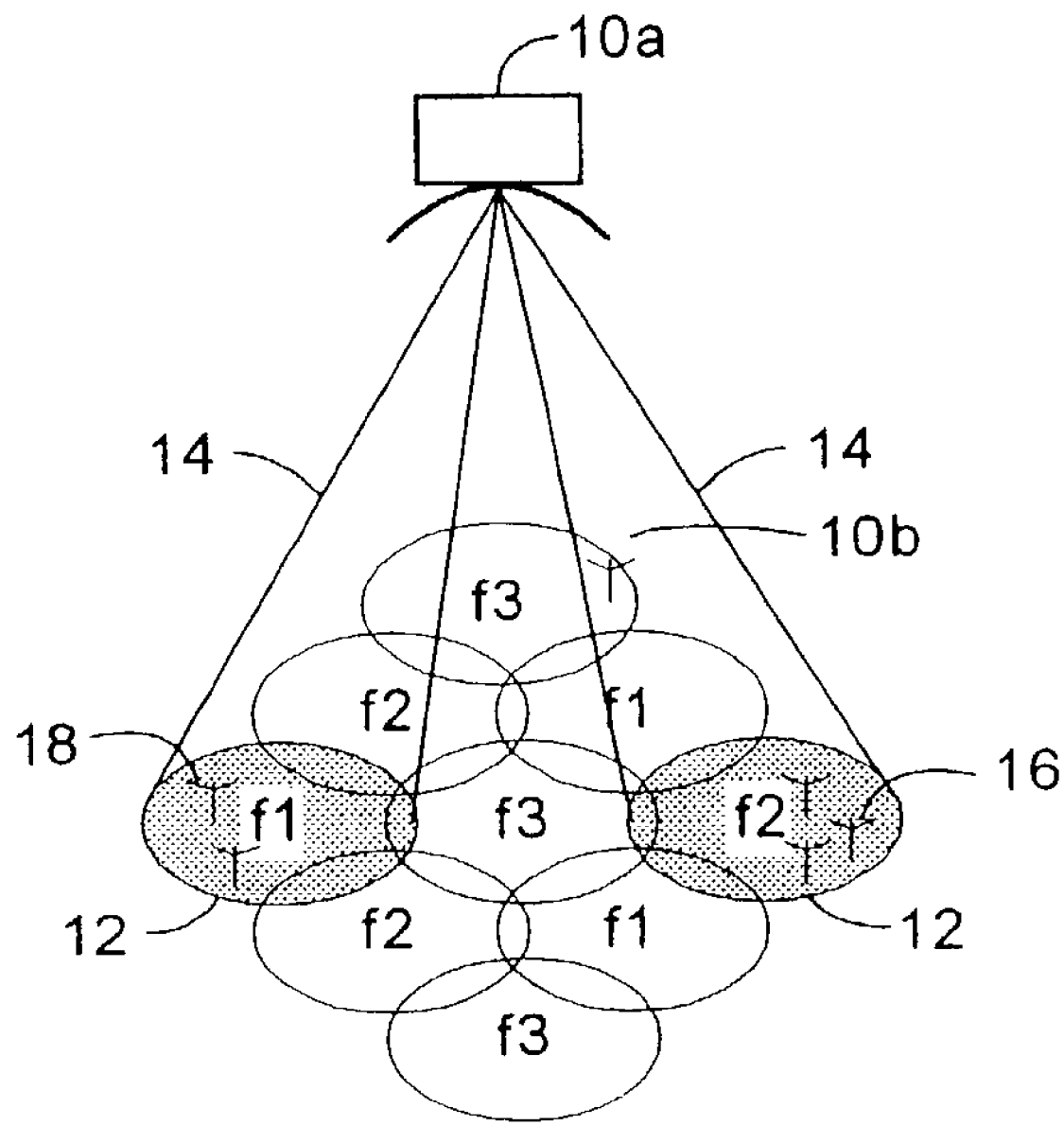
FIG. 1 is a diagram of a communication system capable of utilizing the teachings of the present invention.

A diagram of a communication system for broadcasting radio signals in a netted fashion in accordance with the teachings of the present invention, is shown in FIG. 1. A relay device 10, such as a multiple beam satellite 10a and/or a ground station 10b, is used to cover several distinct geographical regions 12. Beams 14 with sufficient angular separation may share frequencies in order to increase communication capacity without increasing the allocated bandwidth. Further, these relatively narrow beams 14 have higher gain than relatively wide beams and, therefore, smaller antennas may be used on receiving devices 16. A transmitting device 18 in a first beam 14 transmits a signal to the relay device 10, which in turn retransmits the signal to one or more receiving devices 16. The relay device 10 may transmit the signal directly to a receiving device 16 (e.g., from a first handset to a satellite 10a to a second handset); or, the relay device 10 may transmit the signal to a receiving device indirectly (e.g., from a first handset to a satellite 10a to a ground station 10b to a satellite 10a to a second handset). The receiving devices 16 may be in the same beam 14 as the transmitting device 18 and/or a different beam 14 or beams 14. Further, the ground station(s) 10b may be in any beam(s). In this manner, any of the network participants can broadcast to all other participants.

Net broadcast channels and existing point-to-point voice channels are the same. Although the channel is full duplex, the inherent nature of voice transmission is half duplex (i.e., one terminal transmits, while all the other active participants listen). Therefore, a net can be created using only one voice channel. This allows for a large number of nets to be set up within the coverage area. Further, an unlimited number of users may be supported for each network, and users outside the system (e.g., PSTN users) may participate in the net. The only limiting factors are power, bandwidth, and characteristics of spacecraft payload. However, these limitation factors apply both to the existing voice/data as well as to the net broadcast features.

Preferably, there is one dedicated channel per net per beam. As the net broadcast coverage area expands beyond one beam, additional channel(s) (one per beam/net) are integrated with the specific network. For a system with frequency re-use, the number of channels needed for arbitrary coverage does not exceed the re-use factor. However, a network can be expanded to multiple beams. In other words, a net can cover the same geographical region as the coverage area of the system, or any subset thereof. Further, multiple networks can be setup within the coverage area, or with distinct (possibly overlapping) coverage areas. Each of the nets may be set up and/or be moved into different geographical regions where a conflict exists (i.e., the system may alter coverage area as a function of time independently for each net).

Dynamic resource allocation allows for reconfiguration of the system on demand to handle both voice net broadcast as well as existing voice/data features. Unused resources may be used for point-to-point voice or other existing features. The system supports both existing point-to-point voice/data features as well as voice net broadcast services in each beam/region.

Figure 2:
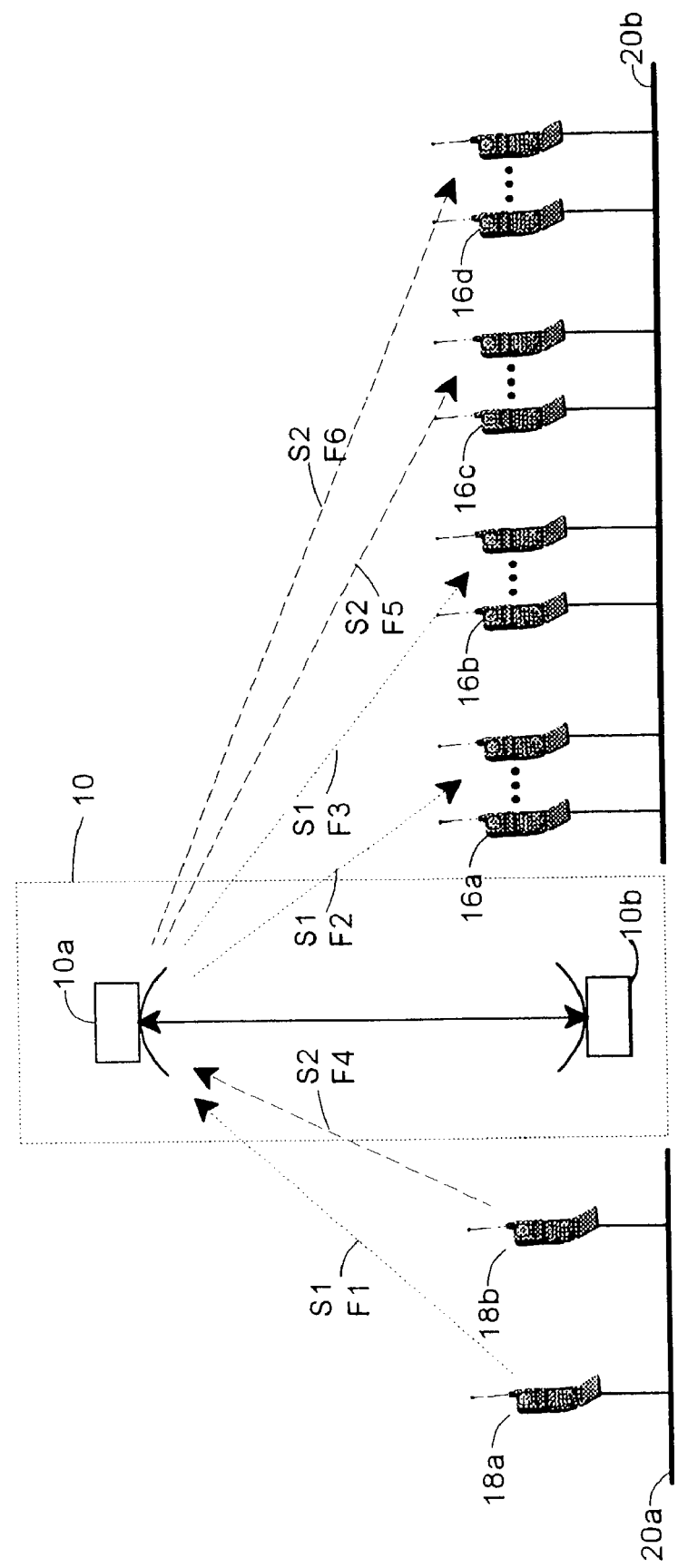
FIG. 2 is a more detailed block diagram of the communication system of FIG.1.

A more detailed block diagram of the communication system of FIG. 1 is illustrated in FIG. 2. A first transmitting device 18a is used to transmit a first signal S1 on a first carrier frequency F1 to the relay device 10 (return link). The first transmitting device 18a is preferably a voice terminal, such as a wireless telephone, but could be a data terminal, such as a portable computer, or any other transmitting device. The first transmitting device 18a is optionally coupled to a communications network 20, such as a public switched telephone network, the Internet, or any other public or private network. The signal is preferably a voice signal, such as an analog voice signal or digitally encoded voice signal, but could be a data signal, such as a data signal originating from a computer, or any other signal. The carrier frequency is preferably a frequency in a band of frequencies allocated for satellite communication, such as the L-band, S-band, C-band, Ku-band and/or a Ka-band of frequencies. However, persons of ordinary skill in the art will readily appreciate that any frequency or band of frequencies may be used in the spirit of the present invention.

The relay device 10 receives the signal S1 by digitally sampling or demodulating the first carrier frequency F1.

Subsequently, the relay device 10 retransmits the signal S1 by mapping it to or modulating a supplementary carrier frequency F2 and optionally another supplementary carrier frequency F3. The relay device 10 is preferably a satellite 10a, such as a digital beam forming geosynchronous communications satellite, and a ground station 10b. However, the relay device 10 could be any device capable of receiving signals on one frequency and retransmitting the signals on another frequency, such as a cellular base station or microwave repeater. Optionally, the relay device 10 may be coupled to a communications network 20 (e.g., a ground station connected to the PSTN). Like the first carrier frequency F1, the supplementary carrier frequencies F2 and F3 are preferably frequencies in bands of frequencies allocated for satellite communication, such as the L-band, S-band, C-band, Ku-band and/or a Ka-band of frequencies.

The signal S1 is then recovered at one or more receiving devices 16a by demodulating the second carrier frequency F2. Optionally, the signal S1 is recovered at one or more receiving devices 16b by demodulating the third carrier frequency F3. Like the transmitting device 18, the receiving devices 16 are preferably voice terminals, such as a wireless telephones, but could be data terminals, such as portable computers, or any other receiving devices. Also like the transmitting device 18, the receiving devices 16 are optionally coupled to a communications network 20 such as a public switched telephone network, the Internet, or any other network.

In a further embodiment, the communication system additionally comprises a second transmitting device 18b, used to transmit a second signal S2 on a fourth carrier frequency F4 to the relay device 10 (e.g., the satellite 10a and the ground station 10b). The second transmitting device 18b is preferably a voice terminal, such as a wireless telephone, but could be a data terminal, such as a portable computer, or any other transmitting device. The second transmitting device 18b is optionally coupled to a communications network 20, such as a public switched telephone network, the Internet, or any other network. The signal is preferably a voice signal, such as an analog voice signal or digitally encoded voice signal, but could be a data signal, such as data originating from a computer, or any other signal. The carrier frequency is preferably a frequency in a band of frequencies allocated for satellite communication, such as the L-band, S-band, C-band, Ku-band and/or a Ka-band of frequencies. However, persons of ordinary skill in the art will readily appreciate that any frequency or band of frequencies may be used in the spirit of the present invention.

The relay device 10 (e.g., the satellite 10a and the ground station 10b) receives the signal S2 by digitally sampling or demodulating the fourth carrier frequency F4. Subsequently, the relay device 10 retransmits the signal S2 by mapping it to or modulating a supplementary carrier frequency F5 and optionally another supplementary carrier frequency F6. Like the other carrier frequencies, F5 and F6 are preferably frequencies in bands allocated for satellite communication, such as the L-band, S-band, C-band, Ku-band and/or a Ka-band of frequencies.

The signal S2 is then recovered at one or more receiving devices 16c by demodulating the fifth carrier frequency F5 and optionally the signal S2 is recovered at one or more receiving devices 16d by demodulating the sixth carrier frequency F6. Like the transmitting device 18, the receiving devices 16 are preferably voice terminals, such as a wireless telephones, but could be data terminals, such as portable computers, or any other receiving devices. Also like the transmitting device 18, the receiving devices 16 are optionally coupled to a communications network 20, such as a public switched telephone network, the Internet, or any other network. In the described communication systems, the transmitting device(s) 18, relay device 10, and/or receiving devices 16 are preferably cooperating members of a multiple access system such as a time division multiple access (TDMA) system, code division multiple access (CDMA) system, and/or frequency division multiple access (FDMA) system.

Terminals with proper authorization to participate in specific nets register themselves into the net by utilizing existing GEM/GSM air interface protocols implemented for point-to-point voice/data services. These messages include specific "cause" for net broadcast feature including identification for specific network. Some of the control messages that may be used include RACH, AGCH, BCCH, and SDCCH protocols which are known in the art. During registration, terminals completing the authentication process are assigned link cipher keys and a network broadcast frequency pair. Further, terminals are provided with any applicable end-to-end Net Secure Key (NSK). After successful completion of registration, terminals can attach themselves to the network and receive specific network traffic.

Figure 3:
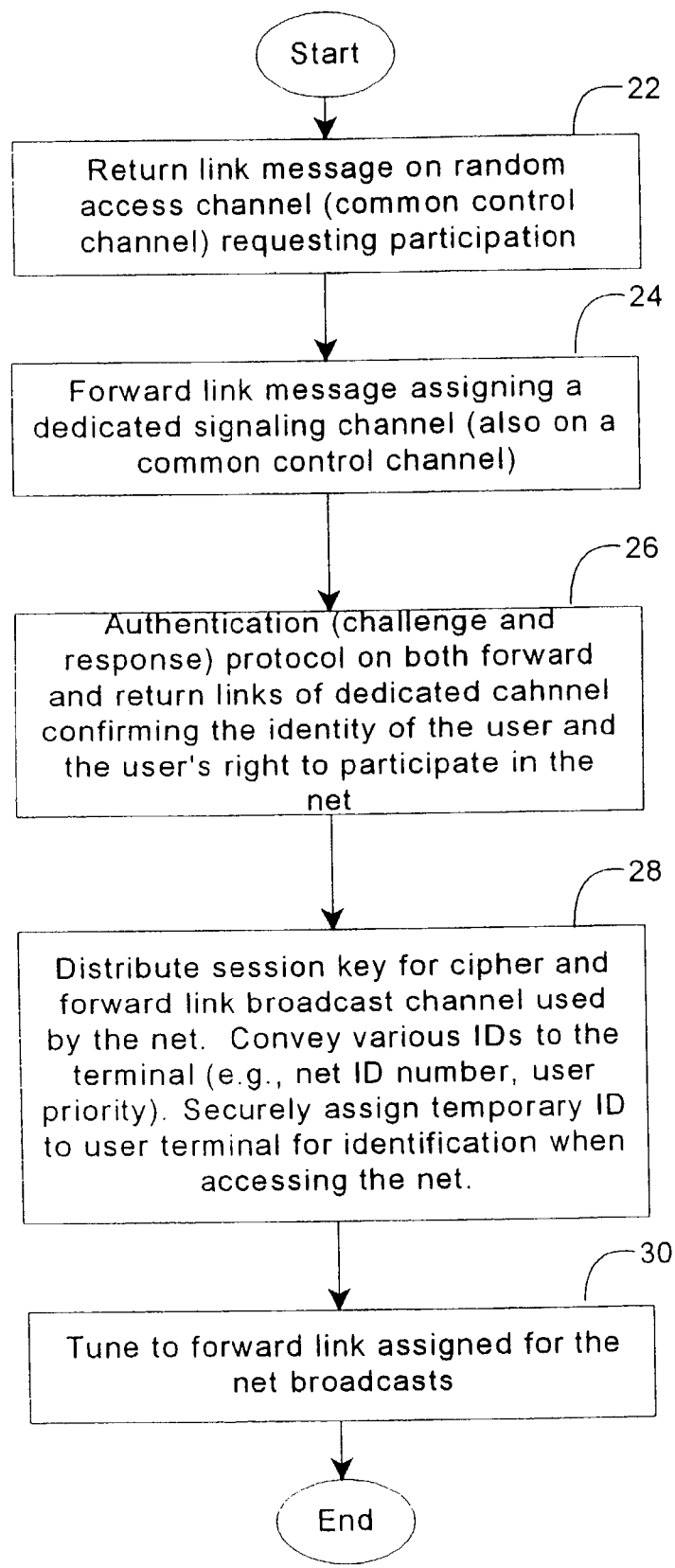
FIG. 3 is a flowchart of a program that can be implemented by the receiving devices of FIG. 1 to join a net.

A flow chart of a program that can be implemented by the receiving devices 16 to receive signals for registration and authentication of a user into the net in accordance with the teachings of the present invention is illustrated in FIG. 3. The programmed steps are performed by a control circuit such as a microprocessor or application specific integrated circuit (ASIC) as is conventional. Once the program is initiated, the control circuit transmits a return link control message (using existing control channels) requesting registration and participation in a predetermined broadcast (block 22). For example, a voice terminal may transmit a message requesting participation in a particular conversation or a data terminal may transmit a message requesting a particular data stream. Next, the control circuit waits until a forward link message is received assigning a dedicated signaling channel for the user to complete the registration (block 24). Subsequently, there is an authentication (challenge and response) protocol on both forward and return links of dedicated channel which confirm the identity of the user and the user's right to participate in the net (block 26). This channel assignment is established solely for use between one terminal and the dispatch center and lasts only so long as is necessary to authenticate the user and convey other signaling information regarding the use of the net.

Next, there is a distribution of a session key for cipher as well as the forward link broadcast channel which is actually used by the net (block 28). Also, various IDs are conveyed to terminal such as the particular net ID number, user priority, etc. The user terminal should also be assigned in a secure fashion, a temporary ID to identify itself when in the future it wants to access the particular net. This in turn leads to the user terminal turning to the forward link assigned for the net broadcasts (block 30) (i.e., the UT is now a member of the net).

The messages received by the UT acknowledges participation and identifies a frequency on which to receive the radio signals. Preferably, the messages also include a control channel for maintenance of the call. This process includes, but is not limited to, authenticating the user and the network, distributing a session key for cipher broadcast, assigning user priority, and assigning a temporary ID. Preferably, the acknowledging and identifying message is transmitted by a relay device 10 such as a satellite 10a and/or ground station 10b. The carrier frequency is preferably a frequency in a band of frequencies allocated for satellite communication, such as the L-band, S-band, C-band, Ku-band and/or a Ka-band of frequencies. Once the acknowledging and identifying message is received (i.e., the registration process has been completed and a frequency has been assigned by the relay station), the control circuit tunes the receiver 16 to the identified frequency and receives the radio signal (block 30). Preferably, the radio signal is a voice and/or digital signal. At this stage, the user has completed its registration and is attached to the net as a member.

During net broadcast a separate control channel is assigned to each beam/net for maintenance services, (e.g., power control, time and frequency synchronization of the user). A terminal which has been registered into a specific net requests permission to transmit (a broadcast signal) by sending a PTT (push-to-talk) message via existing control channels to the ground network. The ground network grants permission to the user to transmit based on the terminal's ID number as well as its priority level. The ground network communicates to the terminal via an existing control channel. By sending the PTT message, a terminal stops transmission. A message is sent to the network indicating the action. The ground network updates its database with the current status of the network. Similarly, a terminal can disconnect and/or remove itself from the network by transmitting an existing disconnect message to the ground network.

Figure 4:
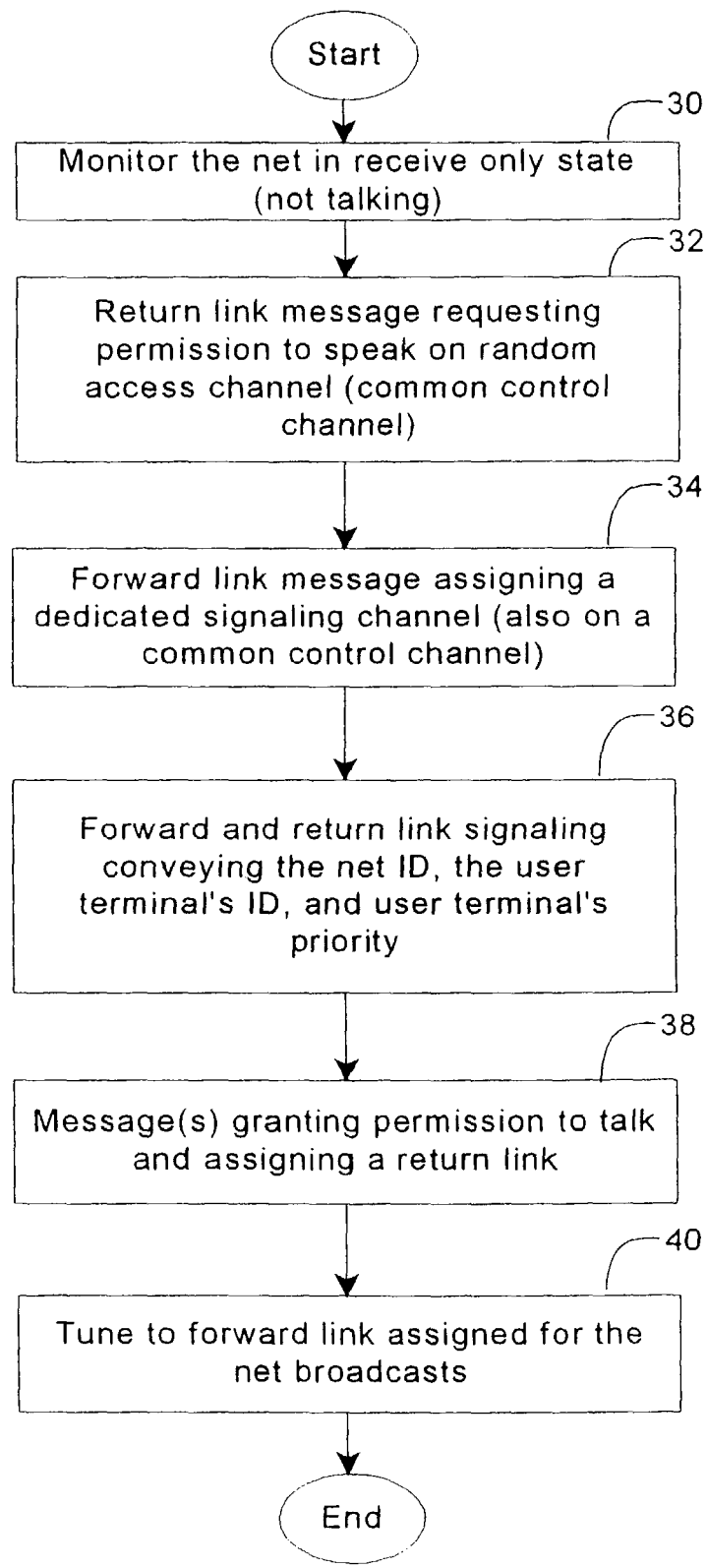
FIG. 4 is a flowchart of a program that can be implemented by the receiving devices of FIG. 1 to speak on a net.

A flow chart of a program that can be implemented by the transmitting devices 18 to transmit signals in accordance with the teachings of the present invention is illustrated in FIG. 4. The programmed steps are performed by a control circuit such as a microprocessor or application specific integrated circuit (ASIC) as is conventional. Once the program is initiated and the terminal has successfully completed its registration/attachment to the net, the control circuit monitors the net (block 30). The control circuit then transmits a return link message requesting permission to speak. This request is transmitted as part of a control channel and includes net ID, own ID and priority (block 32). For example, a voice terminal may transmit a message requesting permission to transmit voice signals (e.g., push-to-talk) in a particular conversation. Next, the control circuit waits until a forward link message is received via the control channel acknowledging the permission to transmit radio signals in the selected net and acknowledging an assigned frequency (block 34). Preferably, the acknowledging and identifying message is transmitted by a relay device 10 such as a satellite 10a and/or ground station 10b.

Subsequently, the devices exchange forward and return link signaling in which the user terminal conveys the net ID, its own ID and priority (e.g., military generals would typically have priority to interrupt private) (block 36). Next, the system grants permission to talk and assigns a return link for the user terminal to convey the user information which is to be broadcast (which may be voice or data) to the dispatcher. A dedicated forward link is used by the dispatcher to convey signaling information to the user. For example, if a private is speaking and was to be interrupted by a general, the dispatcher would signal the user on the dedicated forward link that the private was in fact being cut off. Also, this forward link can be used for time and frequency synchronization as well as for certain other link maintenance functions such as power control, etc. as required. Once the acknowledging and identifying message is received, the control circuit tunes the transmitter 18 to the identified frequency (block 40). Preferably, the radio signal is a voice and/or digital signal. As was indicated previously, a dedicated control channel is used during transmission for each net for maintenance and control functions (e.g., power control, frequency and timing synchronization).

Figure 5:
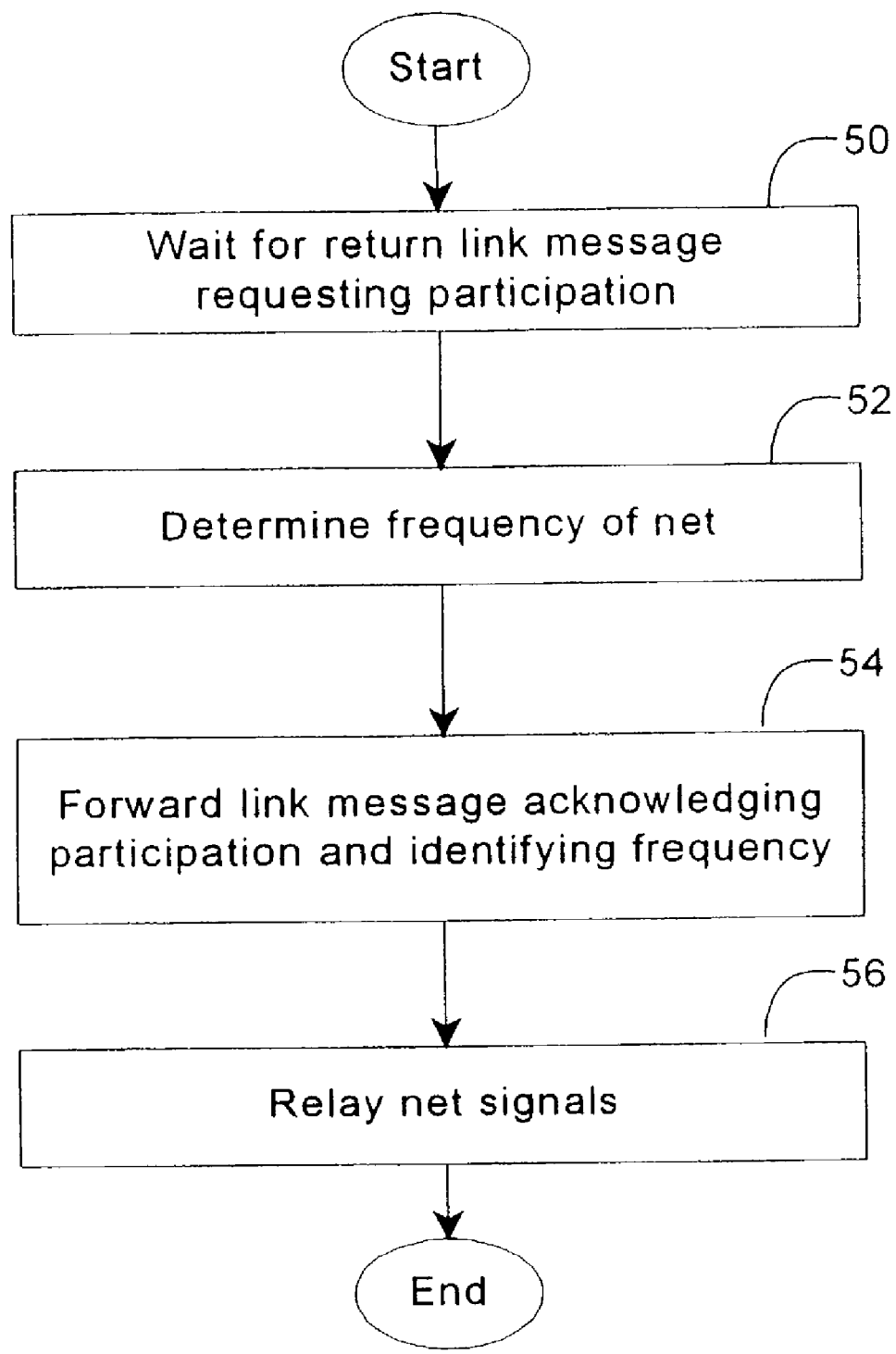
FIG. 5 is a flowchart of a program that can be implemented by the relay device of FIG. 1 to grant permission to a transmitting device and transmit the particular signal to the receiving device.

A flow chart of a program that can be implemented by a relay device 10 (e.g., satellite 10a and/or ground station 10b) to relay signals in accordance with the teachings of the present invention is illustrated in FIG. 5. Again, the programmed steps are performed by a control circuit such as a microprocessor or application specific integrated circuit (ASIC) as is conventional. Participation in the net is activated by the terminal attached to the net, pressing "push-to-talk" (PTT) which is translated into a control message to the ground system. The control message includes at least a net ID, user ID, and priority level. Once the program and signaling are initiated, the control circuit waits until a PTT message is received on the return link requesting participation in a predetermined distribution of a radio signal with which the user has been registered (block 50). Preferably, the requesting message is transmitted by a transmitting device 18 such as a voice terminal or data terminal. Once the return link message requesting participation is received, the control circuit (based on the terminal ID, net ID, and priority level) grants permission to transmit on the predetermined radio signal frequency (block 52). Subsequently, the control circuit sends a forward link via the control channel acknowledging the participation and the frequency of the net (block 54). Finally, the control circuit relays the radio signals (block 56). Preferably, the radio signal is a voice and/or digital signal.

In summary, persons of ordinary skill in the art will readily appreciate that a system and method for broadcasting radio signals in a netted fashion has been provided. Systems and apparatus implementing the teachings of the invention can enjoy increased efficiency in bandwidth utilization, as well as relatively smaller terminal devices.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A system for broadcasting a netted radio signal, comprising:
   a first transmitting device for transmitting a first signal on a first carrier frequency;
   a relay device for receiving the first signal on the first carrier frequency and transmitting the first signal on second and third carrier frequencies;
   at least a first receiving device which receives the first signal on the second carrier frequency after the first receiving device registers with the system as an authorized receiving device for the first signal; and,
   at least a receiving device which receives the first signal on the third carrier frequency after the second receiving device registers with the system as another authorized receiving device for the first signal; and
   further comprising:
   a second transmitting device for transmitting a second signal on a fourth carrier frequency;
   at least a third receiving device for receiving the second signal on a fifth carrier frequency; and
   at least a fourth receiving device for receiving the second signal on the sixth carrier frequency, wherein the relay device for receives the second signal on the fourth carrier frequency and transmits the second signal on the fifth and sixth carrier frequencies.

2. A system as defined in claim 1, wherein the second carrier frequency is normally used for a point-to-point voice channel.

3. A system as defined in claim 2, wherein a control channel is used for the point-to-point channel, and the control channel is used for the netted radio signal.

4. A system as defined in claim 1, wherein the first signal comprises a digital voice signal.

5. A system as defined in claim 1, wherein the first transmitting device comprises at least one of (a) a voice terminal, (b) a data terminal, (c) a time division multiple access communication device, (d) a code division multiple access communication device, and (e) a frequency-division multiple access communication device.

6. A system as defined in claim 1, wherein the first transmitting device is coupled to a communications network.

7. A system as defined in claim 1, wherein the first carrier frequency comprises at least one of (a) an L-band frequency, (b) an S-band frequency, (c) a C-band frequency, (d) a Ku-band frequency, and (e) a Ka-band frequency.

8. A system as defined in claim 1, wherein the relay device comprises a multiple beam geosynchronous communications satellite.

9. A system as defined in claim 1, wherein the relay device comprises a ground station.

10. A system as defined in claim 1, wherein the relay device comprises at least one of (a) a time division multiple access communication device, (b) a code division multiple access communication device, and (c) a frequency-division multiple access communication device.

11. A system as defined in claim 1, wherein a second carrier frequency comprises at least one of (a) an L-band frequency, (b) an S-band frequency, (c) a C-band frequency, (d) a Ku-band frequency, and (e) a Ka-band frequency.

12. A system as defined in claim 1, wherein the first and second receiving device comprises at least one of (a) voice terminals, (b) data terminals, (c) time division multiple access communication devices, (d) code division multiple access communication devices, and (e) frequency-division multiple access communication devices.

13. A system as defined in claim 1, wherein the first receiving device is coupled to a communications network.

* * * * *